(12) United States Patent
Beveridge et al.

(10) Patent No.: US 7,131,752 B2
(45) Date of Patent: Nov. 7, 2006

(54) ARTICULATING CRACK CURING LAMP AND METHOD

(75) Inventors: Keith A. Beveridge, Edina, MN (US); Jonathan P. Thomas, Maple Lake, MN (US)

(73) Assignee: TCG International Inc., Burnaby (CA)

( * ) Notice: Subject to any disclaimer, the term of this patent is extended or adjusted under 35 U.S.C. 154(b) by 46 days.

(21) Appl. No.: 10/987,175

(22) Filed: Nov. 12, 2004

(65) Prior Publication Data

US 2006/0104069 A1    May 18, 2006

(51) Int. Cl.
*F21V 21/00*   (2006.01)
*A45D 20/40*   (2006.01)

(52) U.S. Cl. ............................ 362/397; 392/407

(58) Field of Classification Search ................ 362/219, 362/222, 233, 238, 239, 249, 250, 287, 252, 362/387, 388, 184, 191; 392/407, 412
See application file for complete search history.

(56) References Cited

U.S. PATENT DOCUMENTS

| | | | |
|---|---|---|---|
| 3,988,400 A | 10/1976 | Luhman, III | |
| 4,528,618 A * | 7/1985 | Bitsch | 362/33 |
| 5,234,325 A | 8/1993 | Hill | |
| 5,491,621 A * | 2/1996 | Duty | 362/397 |
| 5,565,217 A | 10/1996 | Beckert et al. | |
| 5,776,506 A | 7/1998 | Thomas et al. | |
| D400,218 S | 10/1998 | Thomas | |
| 6,050,799 A * | 4/2000 | Galyon | 425/12 |
| 6,139,300 A | 10/2000 | Thomas et al. | |
| 6,302,670 B1 * | 10/2001 | Thomas et al. | 425/12 |
| 2004/0057708 A1 * | 3/2004 | Nelson | 392/412 |
| 2004/0202458 A1 * | 10/2004 | Boyle et al. | 392/427 |

OTHER PUBLICATIONS

Liquid Resins International, Ltd. Catalog, 21 pages (Apr. 1, 1992).
The Glass Mechanix® brochure entitled "A Clear Path to Your Future Success," 8 pages (Admitted Prior Art).
Brochure entitled "BONDWand . . . The Light Source That Dosen't Leave You In The Dark," 2 pages (Sep. 1986).
Photographs of a Novus windshield repair ultraviolet curing lamp (Admitted Prior Art).

* cited by examiner

*Primary Examiner*—Renee Luebke
*Assistant Examiner*—Evan Dzierzynski
(74) *Attorney, Agent, or Firm*—Merchant & Gould P.C.

(57) ABSTRACT

A curing lamp apparatus mounts to a work surface with a suction cup. A base is mounted to the suction cup and defines a hinge point for a first bar. At a distal end of the first bar, a second bar is hingedly mounted to the first bar. A first lamp element is hingedly mounted to one end of the second bar. A second lamp element is hingedly mounted to a second end of the second bar. The first and second lamp elements are positionable in a variety of positions to follow the path of a crack in a surface to be repaired. The lamp elements are also foldable into a storage position.

16 Claims, 9 Drawing Sheets

ARTICULATING CRACK CURING LAMP AND METHOD

FIELD OF THE INVENTION

The present invention relates to curing lamps for curing repair material used to repair cracks in windshields or other glass or plastic materials.

BACKGROUND OF THE INVENTION

When a windshield or other glass or plastic material becomes cracked, a resin or other repair material can be used to repair the crack. Various repair bridges or devices with resin injectors are known for applying repair resin to the crack including devices shown in U.S. Pat. Nos. 5,565,217; 5,776,506; 6,139,300 and 6,302,670.

Often the repair material needs to be cured with an ultraviolet light source. Lamps including a UV light source are known which are positioned adjacent to the windshield or other surface, close to the crack to cure the repair material positioned in the crack.

Various concerns exist with respect to curing lamps. Typically, cracks are cured on site, so the repair technician needs to be able to transport all necessary equipment to the location of the windshield or other material to be repaired. Also, the repair technician is desirous of repairing the crack in an efficient manner with good results. Many times the lamp is not as long as the crack to be repaired. Typically, the lamp is moved along the crack to cure the resin along the crack. A lamp which is too small may not cover enough area over the crack to be efficient for the technician. Conversely, a lamp which is too large is wasteful, may not follow the path of the crack, and may be difficult to transport. If the lamp is not appropriately placed over the repair material, the material may not properly cure.

There is a need for further improvements with respect to curing lamps.

SUMMARY OF THE INVENTION

The present invention includes a curing lamp apparatus for mounting to a work surface including a suction cup engageable with the work surface, and a base mounted to the suction cup. A first bar is hingedly mounted to the base and includes a distal end extending away from the base. A second bar is hingedly mounted at the distal end of the first bar and includes first and second hingedly mounted lamp elements.

A further aspect of the present invention relates to a curing lamp for mounting to a work surface wherein first and second lamp elements are each hingedly mounted at a distal end of a bar, and wherein a proximal end of the bar is mountable to a work surface with a suction cup.

Another aspect of the present invention relates to a method of using a curing lamp including the steps of mounting a base of a lamp apparatus to a surface to be repaired, rotating a first lamp of the lamp apparatus relative to a first arm to position the first lamp over a first portion of a crack in the surface, and rotating a second lamp of the lamp apparatus relative to the arm to position the second lamp over a second portion of the crack in the surface. The method preferably includes rotating the arm of the lamp apparatus relative to the base.

The lamp apparatus and method of the present invention further concerns a folding lamp with first and second lamp elements separately hinged, and with the lamp being mountable to the surface to be repaired.

DETAILED DESCRIPTION OF THE PREFERRED EMBODIMENT

Figure 1:
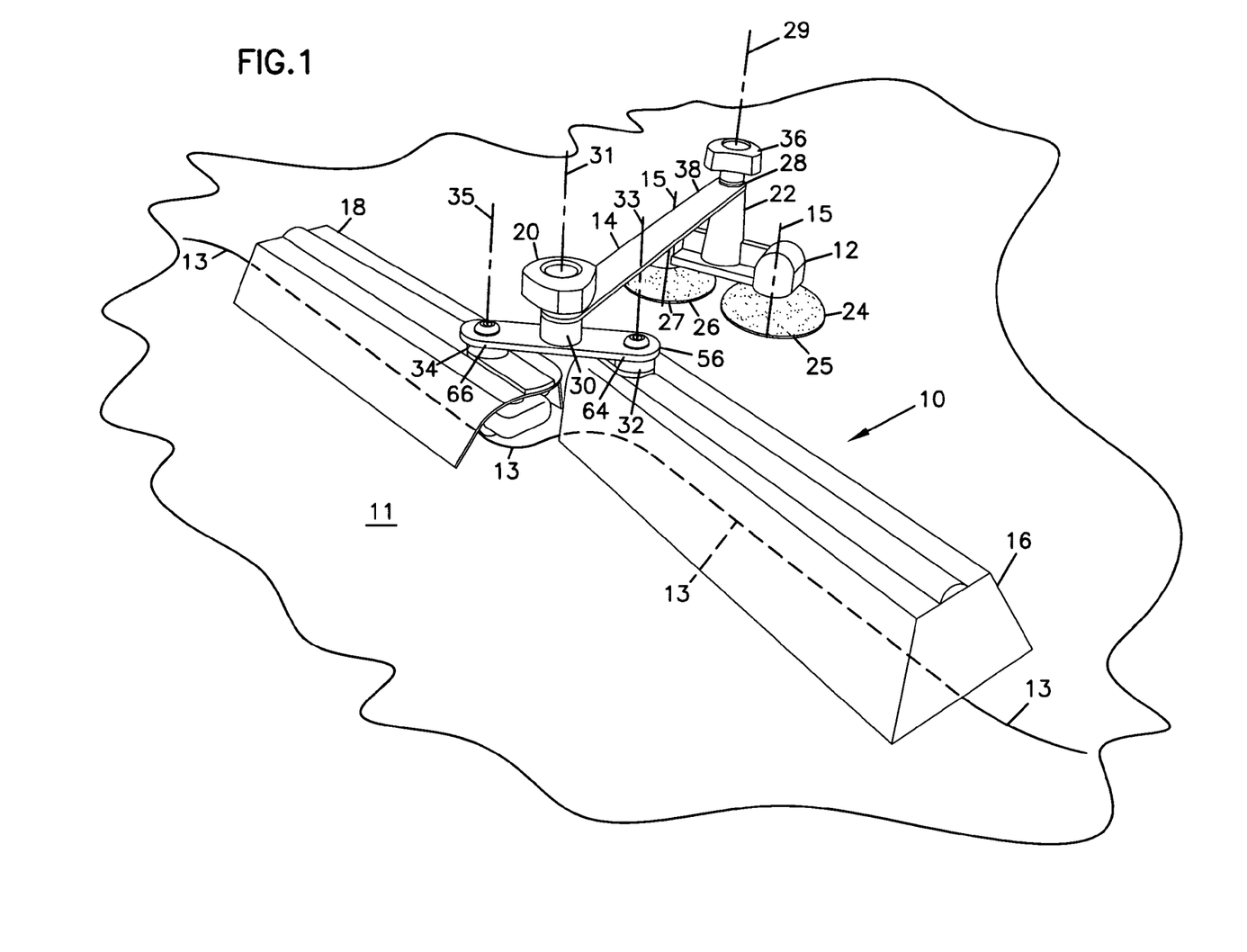
FIG. 1 is a perspective view of a curing lamp in accordance with one embodiment of the present invention mounted on a windshield over a crack.
Figure 2:
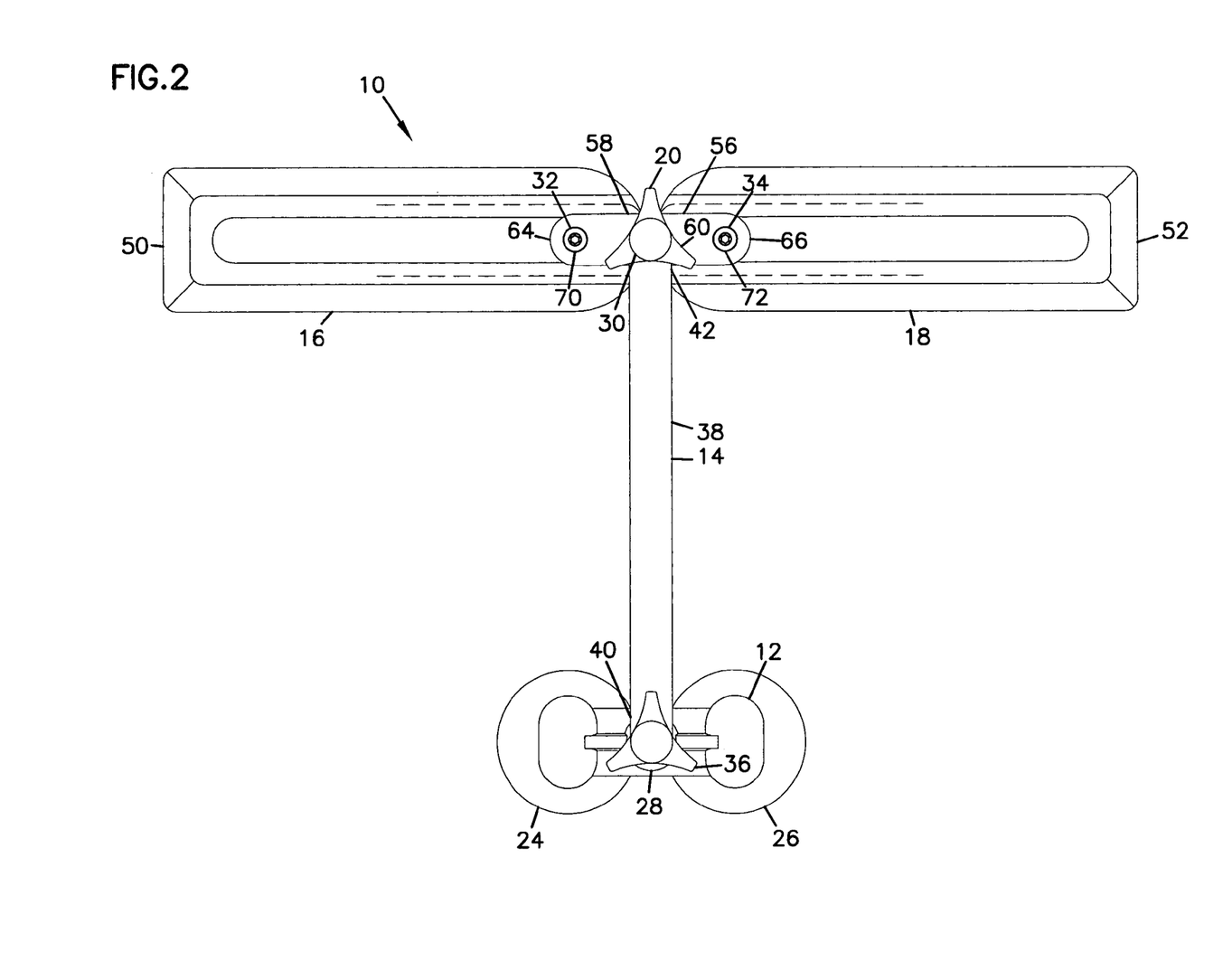
FIG. 2 is a top view of the curing lamp shown in a first position.

Referring now to FIGS. 1 and 2, a lamp apparatus 10 in accordance with one preferred embodiment of the present invention is shown. Lamp apparatus 10 includes a base 12 including at least one suction cup 24 used for mounting lamp apparatus 10 to a windshield or other surface 11 to be repaired. In the illustrated embodiment, base 12 includes first and second suction cups 24, 26. Extending from base 12 is an arm 14 having a distal end 20 including at least one lamp element 16, 18. In the preferred embodiment, two lamp elements are provided. Each lamp element 16, 18 projects ultraviolet (UV) light on the windshield 11. Lamp apparatus 10 and the UV light it provides is used to cure repair material positioned in a crack 13 in windshield 11.

Base 12 includes a mount 22 for defining a first hinge point 28 between base 12 and arm 14. Arm 14 can be pivotally moved relative to base 12 about first hinge point 28. Tensioning knob 36 allows arm 14 to be clamped or held more tightly to base 12 to prevent or limit rotation. Release of knob 36 allows arm 14 to more freely pivot to a new position. Knob 36 is threadably mounted to a fastener (not shown) at hinge point 28.

Arm 14 includes a first bar 38 extending from a proximal end 40 adjacent to base 12 to a distal end 42. A second bar 56 is hingedly mounted to distal end 42 of first bar 38. Both lamp elements 16, 18 mount to second bar 56. A center 58 of bar 56 is hingedly mounted to distal end 42 of first bar 38 to define a second hinge point 30 for lamp apparatus 10. A tensioning knob 60 allows for second bar 56 to be clamped or held more tightly to first bar 38 to prevent or limit rotation. Release of knob 60 allows second bar 56 to more freely pivot to a new position. Knob 60 is threadably mounted to a fastener (not shown) at hinge point 30.

At distal ends 64, 66 of second bar 56, lamp elements 16, 18 are mounted. Preferably, the mount between second bar 56 and each lamp element 16, 18 is hinged. Distal end 64 of second bar 56 is mounted to lamp element 16 and defines a third hinge point 32. Opposite distal end 66 of second bar 56 is hingedly mounted to second lamp element 18 to define a fourth hinge point 34. The hinge mounts between distal ends 64, 66 of second bar 56 and each lamp element 16, 18 are defined by fasteners 70, 72 in the illustrated embodiment. Tension in the hinge mount can be adjusted through the use of a screwdriver.

Figure 3:
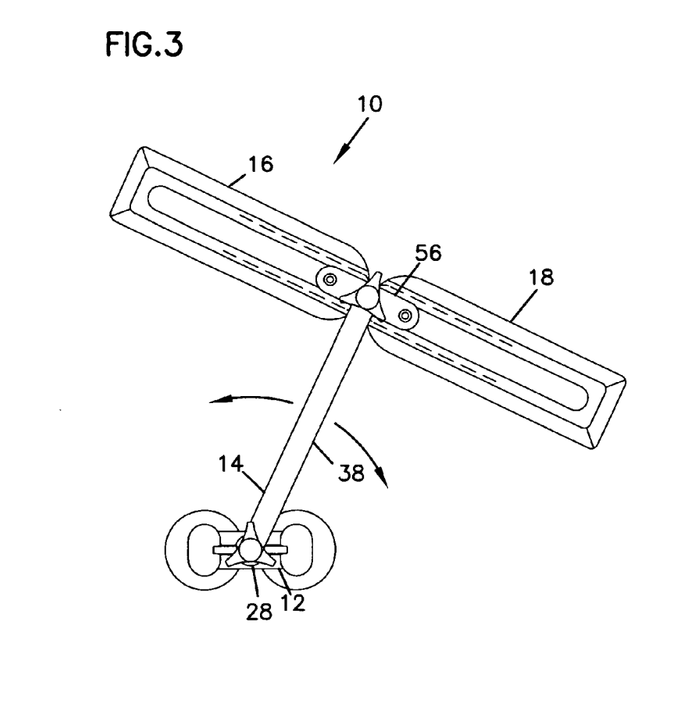
FIGS. 3 and 4 show the top view of the curing lamp of FIG. 2 with the lamp in rotated positions about a first hinge point.
Figure 4:
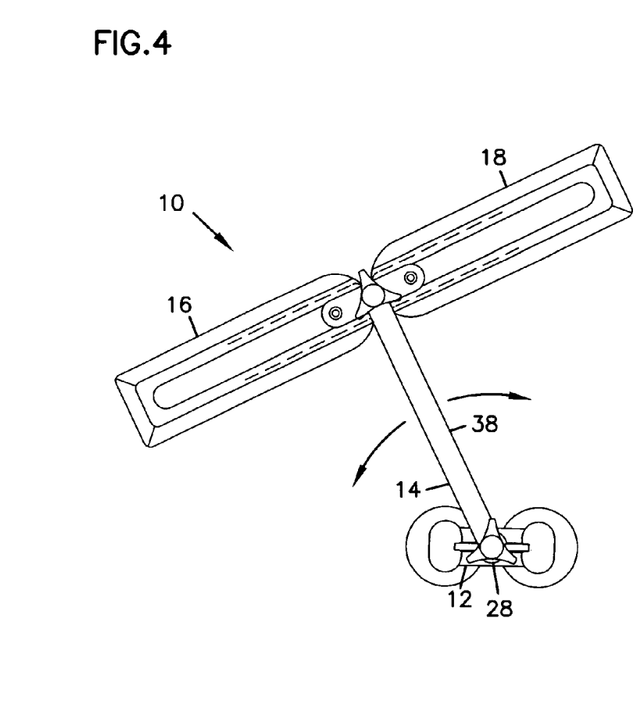

Referring now FIGS. 3 and 4, first bar 38 is moveable about first hinge point 28 as shown. First hinge point 28 defines a hinge axis 29 perpendicular to suction cup surfaces 25, 27 (see FIG. 1). Lower suction cup surfaces 25, 27 both are perpendicular to longitudinal axes 15, which are perpendicular to windshield 11 as shown in FIG. 1.

Figure 5:
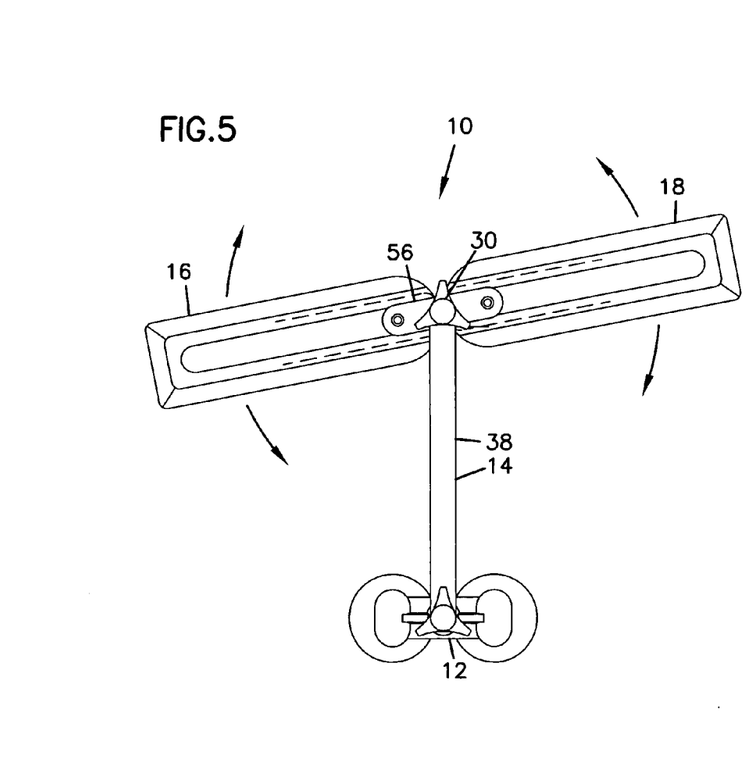
FIGS. 5 and 6 show the top view of the curing lamp of FIG. 2 with the lamp in rotated positions about a second hinge point.
Figure 6:
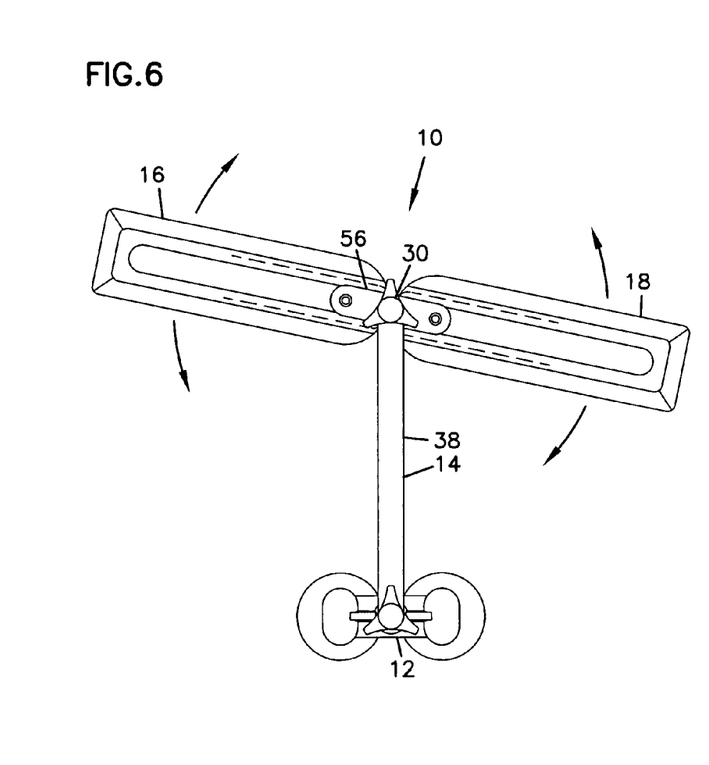

Referring now to FIGS. 5 and 6, second bar 56 is also moveable as desired about second hinge point 30. Second hinge point 30 defines a hinge axis 31 parallel to longitudinal axes 15. In the preferred embodiment, lamp apparatus 10 includes the movements illustrated in FIGS. 3 and 4 and in FIGS. 5 and 6 in order to provide more flexibility for positioning lamp elements 16, 18 over crack 13 in windshield 11.

Figure 7:
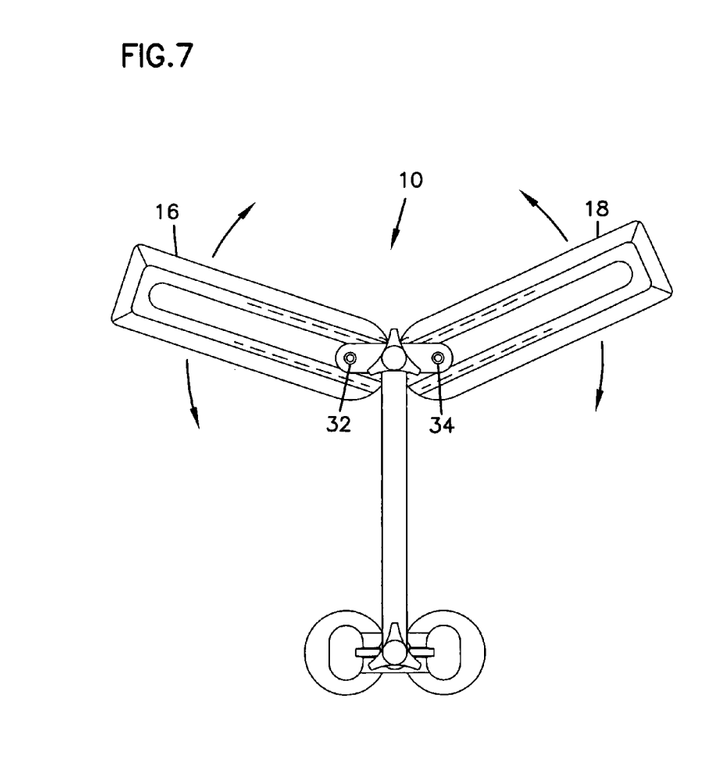
FIGS. 7 and 8 show the top view of the curing lamp of FIG. 2 with the lamp in rotated positions about third and fourth hinge points.
Figure 8:
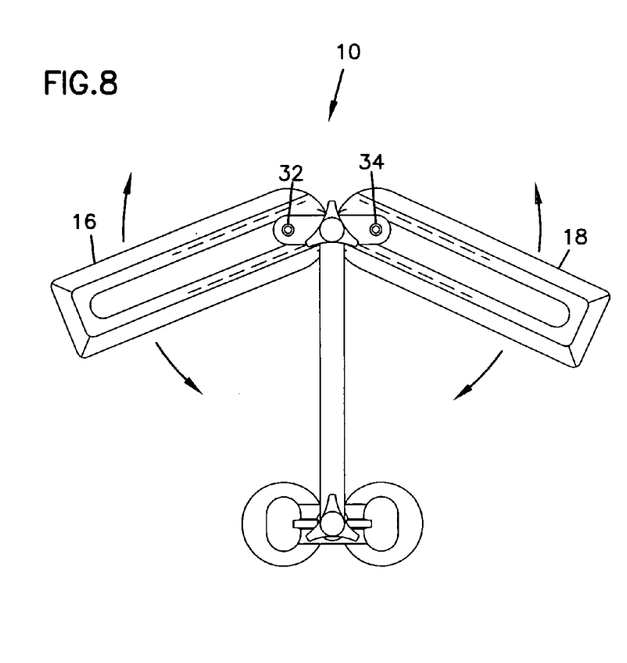

Referring now to FIGS. 7 and 8, each lamp element 16, 18 is pivotally moveable about respective hinge points 32, 34 as shown. Lamp elements 16, 18 move independently in the preferred embodiment. Lamp elements 16, 18 pivot about respective first and second hinge axes 33, 35 which are parallel to longitudinal axes 15. In the preferred embodiment, lamp elements 16, 17 are moveable as shown in FIGS. 7 and 8, along with movements of first bar 38 and second bar 56 as shown in FIGS. 3 and 4, and FIGS. 5 and 6, respectively. In this manner, a variety of positions for lamp elements 16, 18 are possible in order to more closely follow a variety of different crack shapes.

Figure 9:
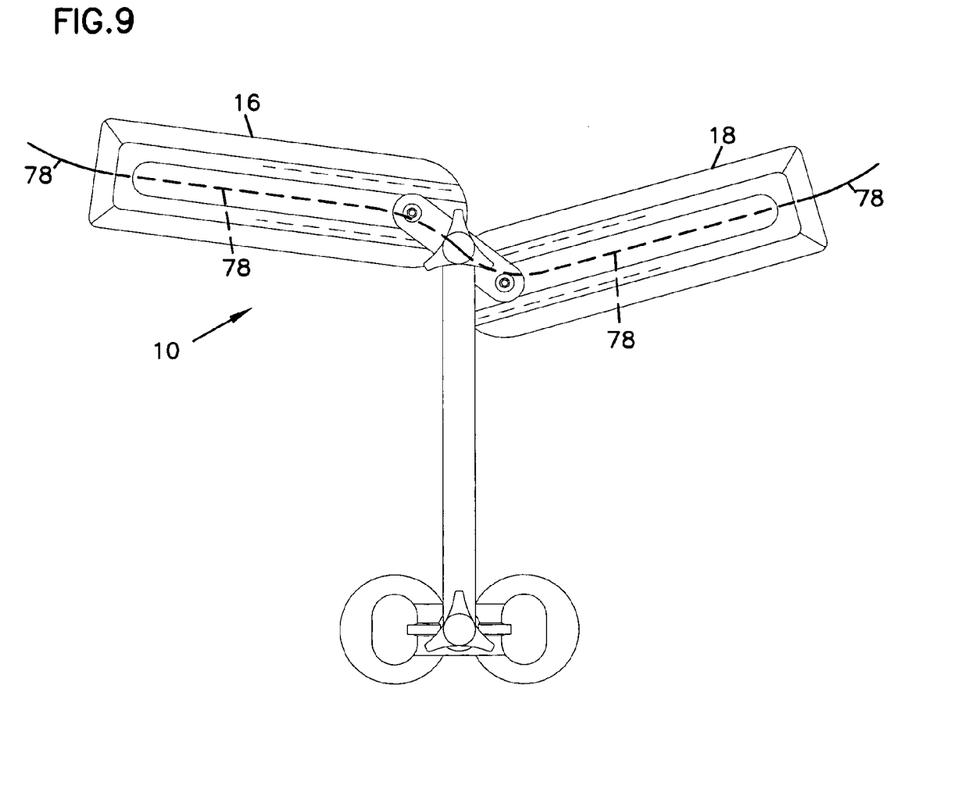
FIG. 9 is a top view of the curing lamp showing a position of the lamp for a crack having an S-curve.

Referring now to FIG. 9, lamp apparatus 10 is shown with lamp elements 16, 18 in position to follow a crack 78 having an S-curve.

Figure 10:
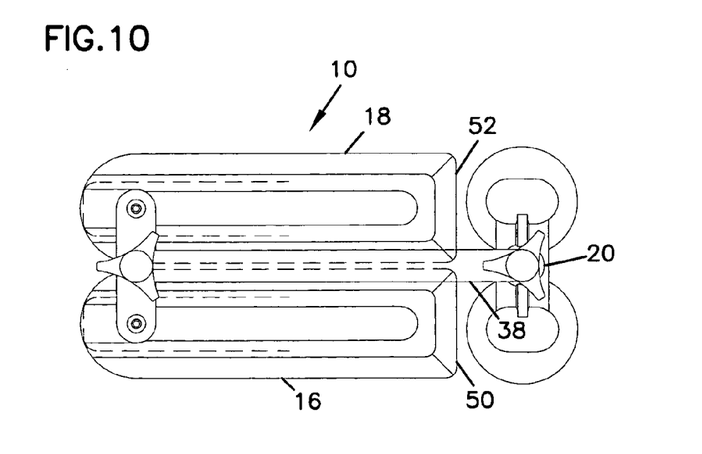
FIG. 10 is a top view of the curing lamp shown in the folded position.

Referring now to FIG. 10, lamp apparatus 10 is shown in a folded position, such as for storage or transport. In the folded position, lamp elements 16, 18 are positioned parallel to first bar 38 with distal ends adjacent to base 20.

Figure 11:
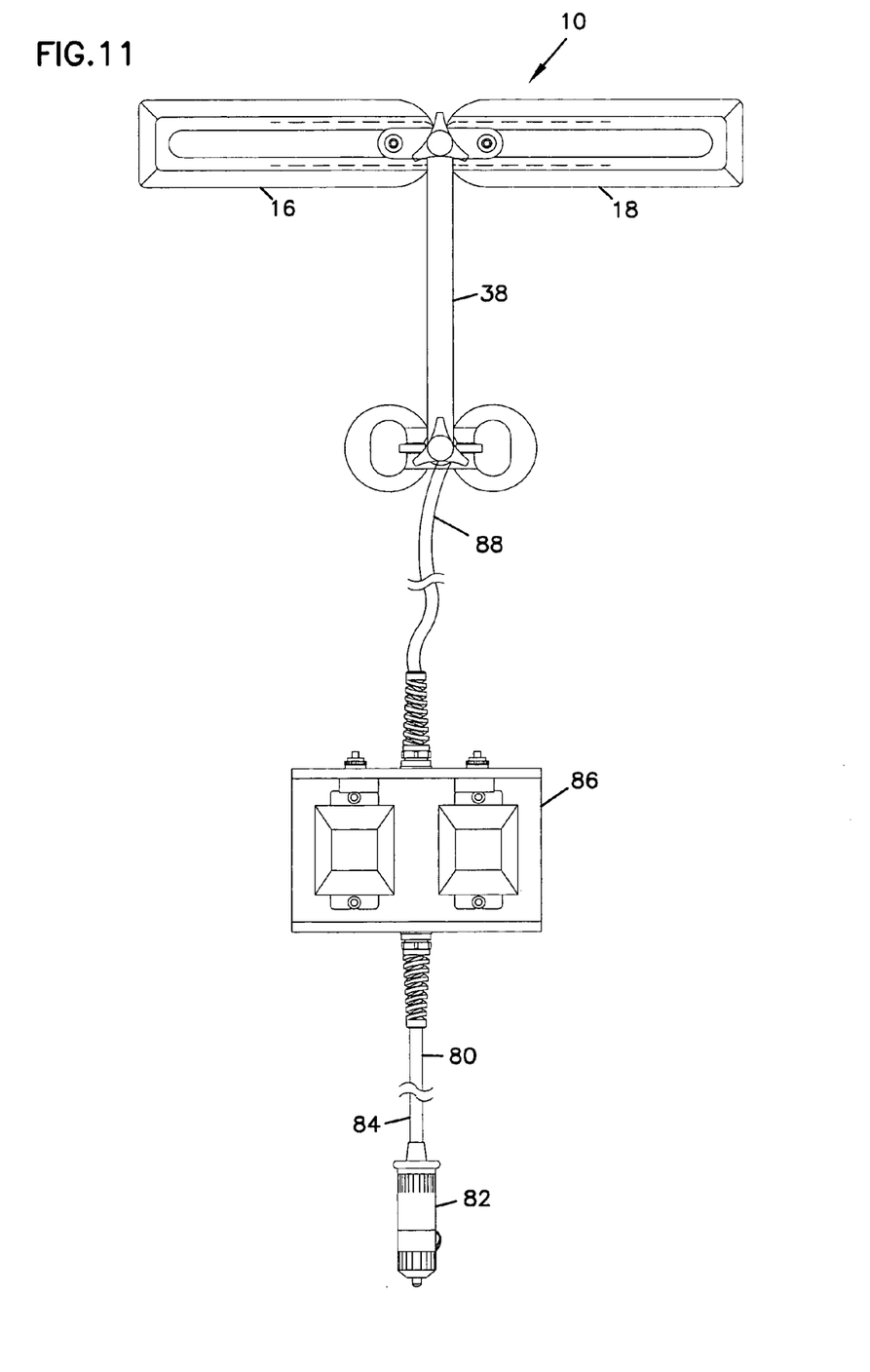
FIG. 11 shows the curing lamp including the power cord and remote ballast.

Referring now to FIG. 11, further features of lamp apparatus 10 are shown. A power cord 80 extends from a plug 82 through a first flexible cord portion 84 to a ballast 86 necessary to power ultraviolet light bulbs in lamp elements 16, 18. Extending from ballast 86 is a second flexible cord portion 88 which extends to and follows along first bar 38 to carry necessary power to first and second lamp elements 16, 18.

Figure 12:
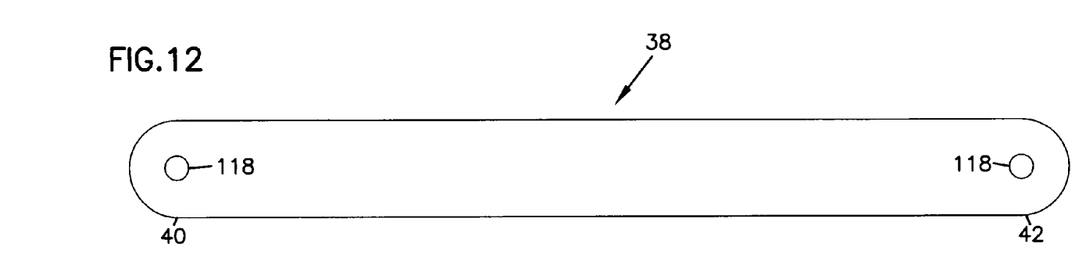
FIG. 12 is a top view of a first bar element of the curing lamp.

Referring now to FIG. 12, first bar 38 is shown in greater detail including proximal and distal ends 40, 42 including fastener openings 118.

Figure 13:
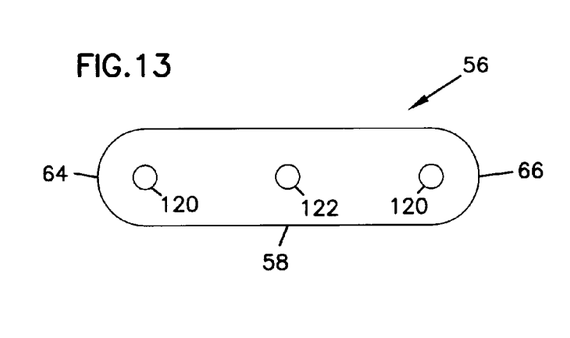
FIG. 13 is a top view of a second bar element of the curing lamp.
Figure 14:
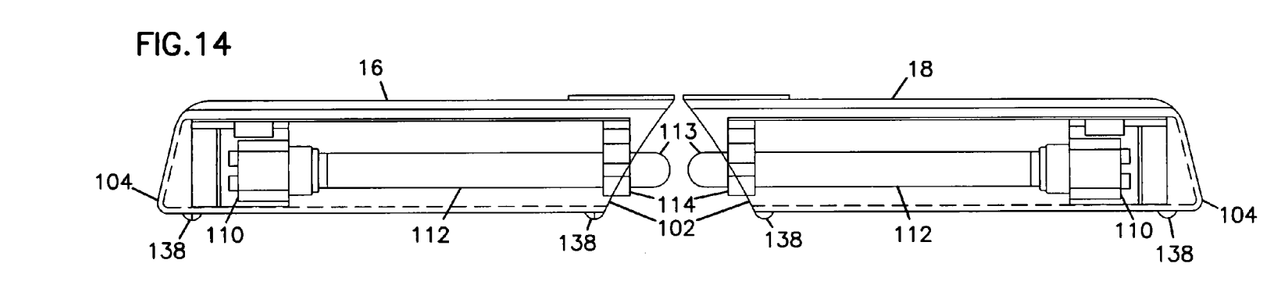
FIG. 14 is a side view of the curing lamp with portions removed and showing the two lamp elements, extending in opposite directions. Internal portions of the two lamp elements are also shown in FIG. 14.

Referring now to FIG. 13, second bar 56 is shown including fastener openings 120 positioned at distal ends 64, 66, and fastener opening 122 at mid-point 58 of second bar 56.

Figure 15:
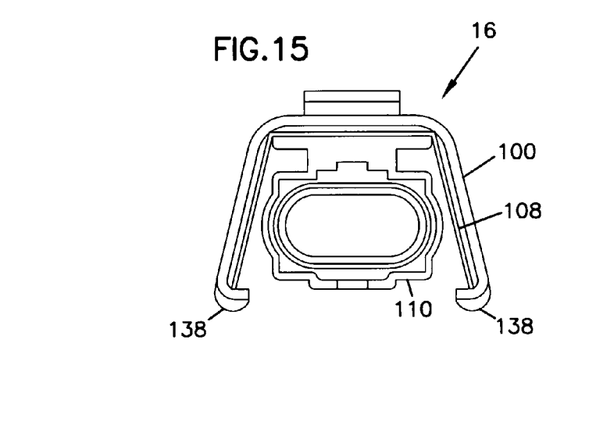
FIG. 15 is an end view of one of the lamp elements.
Figure 16:
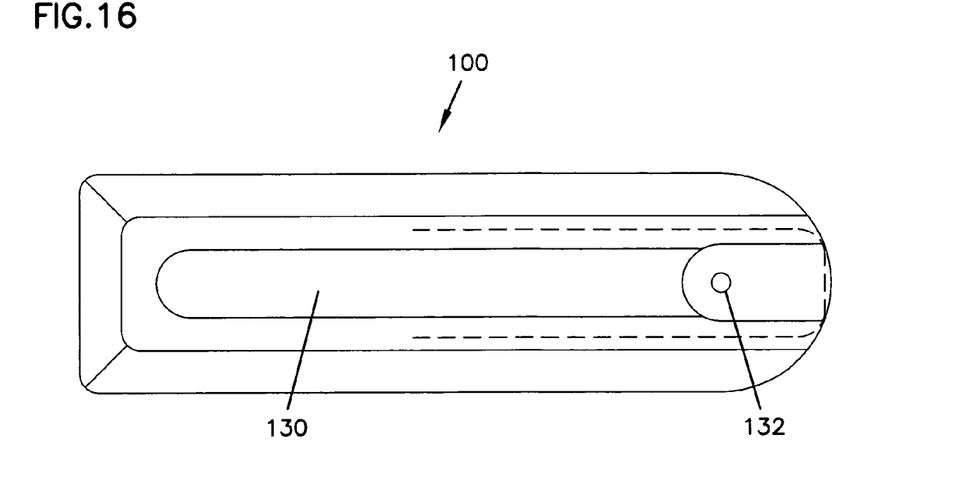
FIG. 16 is a top view of one of the lamp elements.
Figure 17:
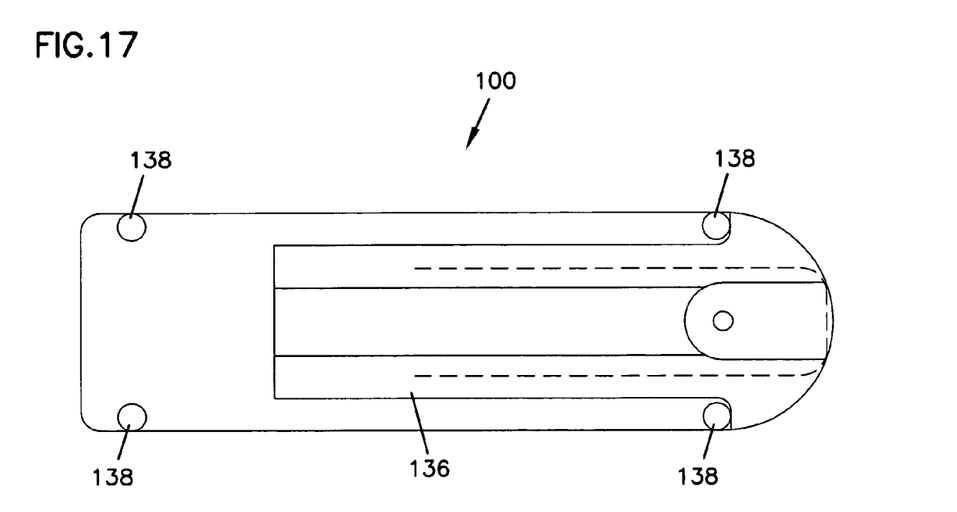
FIG. 17 is a bottom view of one of the lamp elements.

Referring now to FIGS. 14–17, each of first and second lamp elements 16, 18 includes a lamp housing 100 around a reflector 108 (see FIG. 15). Also disposed within lamp housing 100 is a bulb socket 110 and a linear bulb 112. Bulb clips 114 hold the distal ends 113 of bulbs 112. Lamp housing 100 generally includes an open end 102 and a closed end 104. As shown in FIG. 12, open ends 102 are positioned adjacent one another, and closed ends are 104 located at distal ends of each lamp element 16, 18. Open ends 102 of lamp housing 100 are provided so as to not obstruct light extending from bulbs 112 adjacent to the flexible ends 102.

Lamp housing 100 includes an upper surface 130 defining a fastener opening for the respective fastener associated with third and fourth hinge points 32 and 34. Bottom 134 of lamp housing 100 defines a U-shaped opening 136 to allow light to project on to the surface to be cured. Small rounded feet 138 on bottom surface 134 engage the surface to be repaired.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A curing lamp apparatus for mounting to a work surface comprising:
    a suction cup defining a longitudinal axis perpendicular to a suction cup surface engageable with the work surface;
    a base mounted to the suction cup;
    a first bar having a proximal end hingedly mounted to the base and a distal end extending from the base, and further defining a first hinge point between the base and the proximal end of the bar;
    a second bar hingedly mounted at a midpoint of the second bar to the distal end of the first bar, and further defining a second hinge point between the first bar and the second bar, the second bar including first and second distal ends extending from the midpoint;
    a first lamp element hingedly mounted to the first distal end of the second bar, and further defining a third hinge point between the first distal end of the second bar and the first lamp element;
    a second lamp element hingedly mounted to the second distal end of the second bar, and further defining a fourth hinge point between the second distal end of the second bar and the second lamp element.

2. The curing lamp apparatus of claim 1, further comprising a second suction cup mounted to the base.

3. The curing lamp apparatus of claim 1, further comprising a first knob for adjusting a tension of the first hinge point between the base and the first bar.

4. The curing lamp apparatus of claim 3, further comprising a second knob for adjusting a tension of the second hinge point between the first bar and the second bar.

5. The curing lamp apparatus of claim 1, further comprising a knob for adjusting a tension of the second hinge point between the first bar and the second bar.

6. The curing lamp apparatus of claim 1, wherein each lamp element includes a bulb socket positioned at a distal end of each lamp element relative to the respective third and fourth hinge points between the second bar and each respective first and second lamp elements.

7. The curing lamp apparatus of claim 1, wherein each of the first and second lamp elements include:
    a bulb;
    a bulb socket, wherein each bulb socket receives the bulb of the respective first and second lamp elements, and wherein each bulb socket is positioned at a distal end of the respective first and second lamp elements spaced from the respective third and fourth hinge points.

8. The curing lamp apparatus of claim 7, further comprising a flexible power cord extending from the base in a first direction along the first bar to the first and second lamp elements, wherein the power cord extends from the base in a second, opposite, direction to a power plug, and wherein a ballast for the first and second lamp elements is positioned in line with the power cord between the base and the power plug.

9. The curing lamp apparatus of claim 8, wherein the bulb in each of the first and second lamp elements is a linear bulb, and wherein the first and second lamp elements each include an outer housing having a closed distal end and an open proximal end, the closed distal end positioned at the distal end of the respective first and second lamp elements.

10. The curing lamp apparatus of claim 1, wherein the first and second lamp elements define linear light sources.

11. The curing lamp apparatus of claim 10, wherein the first and second lamp elements each include an outer housing having a closed distal end and an open and proximal end, the open proximal ends positioned adjacent to the respective third and fourth hinge points.

12. A curing lamp for mounting to a work surface comprising:
a suction cup defining a longitudinal axis perpendicular to a suction cup surface engageable with the work surface;
a base mounted to the suction cup;
a bar having first and second ends, wherein the first end is mounted to the base, and the second end defines a distal end spaced from the base;
a first lamp element hingedly mounted to the distal end of the bar to define first axis parallel to the longitudinal axis;
a second lamp element hingedly mounted to the distal end of the bar to define a second axis parallel to the longitudinal axis, the second lamp element hingedly moveable separate from the first lamp element.

13. The curing lamp of claim 12, wherein the first end of the bar is hingedly mounted to the base.

14. The curing lamp of claim 12, wherein the first and second lamp elements define linear light sources.

15. A method of using a curing lamp comprising:
mounting a base of a lamp apparatus to a surface to be repaired;
rotating a first arm of the lamp apparatus relative to the base;
rotating a first lamp of the lamp apparatus relative to the first arm to position the first lamp over a first portion of a crack in the surface;
rotating a second lamp of the lamp apparatus relative to the first arm to position the second lamp over a second portion of the crack in the surface.

16. A method of using a curing lamp comprising:
unfolding in a first direction a first lamp element of the lamp from a first position next to an arm of the lamp to a second position where a distal end of the first lamp is spaced from the arm;
unfolding in an opposite direction to the first direction a second lamp element of the lamp from a first position next to the arm to a second position where a distal end of the second lamp is spaced from the arm;
mounting the lamp to a surface with a suction cup.

* * * * *